United States Patent
Oyabe et al.

(10) Patent No.: US 7,247,400 B2
(45) Date of Patent: Jul. 24, 2007

(54) FUEL CELL AND METHOD OF CONTROLLING THE SAME

(75) Inventors: Yosuke Oyabe, Tsushima (JP); Shinji Nezu, Obu (JP); Naoki Ito, Aichi-ken (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 238 days.

(21) Appl. No.: 10/785,091

(22) Filed: Feb. 25, 2004

(65) Prior Publication Data

US 2004/0247955 A1  Dec. 9, 2004

(30) Foreign Application Priority Data

Feb. 25, 2003  (JP) .............................. 2003-047366

(51) Int. Cl.
*H01M 8/00* (2006.01)
*H01M 8/13* (2006.01)

(52) U.S. Cl. .......................... 429/13; 429/21
(58) Field of Classification Search ................. 429/13, 429/22, 23, 30, 21
See application file for complete search history.

(56) References Cited

U.S. PATENT DOCUMENTS

| | | | |
|---|---|---|---|
| 5,460,896 A * | 10/1995 | Takada et al. ................. | 429/33 |
| 5,874,182 A | 2/1999 | Wilkinson et al. ............ | 429/30 |
| 5,958,616 A | 9/1999 | Salinas et al. ................. | 429/41 |
| 6,242,122 B1 | 6/2001 | Dohle et al. ................... | 429/30 |
| 6,756,141 B2 * | 6/2004 | Miller et al. ................... | 429/22 |
| 2003/0008196 A1 | 1/2003 | Wessel et al. ................. | 429/40 |
| 2004/0247955 A1 | 12/2004 | Oyabe et al. | |

FOREIGN PATENT DOCUMENTS

| | | |
|---|---|---|
| DE | 103 34 806 | 3/2004 |
| JP | 58-176879 | 10/1983 |
| JP | 62-10876 | 1/1987 |
| JP | 6-103992 | 4/1994 |

OTHER PUBLICATIONS

U.S. Appl. No. 10/629,550, filed Jul. 30, 2003, Nezu et al.
U.S. Appl. No. 10/785,091, filed Feb. 25, 2004, Oyabe et al.
U.S. Appl. No. 11/064,093, filed Feb. 24, 2005, Xie et al.

* cited by examiner

*Primary Examiner*—Stephen Kalafut
*Assistant Examiner*—Thomas H. Parsons
(74) *Attorney, Agent, or Firm*—Oblon, Spivak, McClelland, Maier & Neustadt, P.C.

(57) ABSTRACT

A polymer solid electrolyte type fuel cell includes an internal electrode in an ion exchange membrane made of a proton conductor, a voltage application device provided between the internal electrode and one of a fuel electrode and an oxidizer electrode. Applying voltage to the internal electrode makes it possible to control fuel and/or oxidizer movements in the electrolyte.

7 Claims, 8 Drawing Sheets

FUEL CELL AND METHOD OF CONTROLLING THE SAME

FIELD OF THE INVENTION

The present invention relates to a fuel cell using a proton conductor as an electrolyte and a method of controlling the fuel cell.

BACKGROUND OF THE INVENTION

Description of Related Art

Fuel cells are expected to spread widely as a power source for automobile and domestic uses. Depending on the kinds of electrolyte, various fuel cells are under investigation, however, phosphoric acid type fuel cells and polymer solid electrolyte type fuel cells are typical examples as those using a proton conductor as an electrolyte. Particularly, polymer solid electrolyte type fuel cells, due to the fact that they are light in weight, small in size, and operable even at lower temperatures, are paid to attention as a power source for electric automobiles.

In a fuel cell using a proton conductor as an electrolyte, fuel such as hydrogen, methanol or the like is fed to a fuel electrode to be oxidized at an anode or a fuel electrode, thereby to produce electrons and protons. Protons pass through a proton conductor that acts as an electrolyte and reach a cathode as an oxidizer electrode at a counter position to react with oxygen and electrons to produce water which are fed to the oxidizer electrode directly and by way of an external load from the fuel electrode, respectively, an electron fed through outer load from the fuel electrode. In this procedure, a voltage corresponding to free energy change in producing the water by reaction of the oxygen with the used fuel is generated as a maximum voltage between the fuel electrode and the oxidizer electrode. Such a voltage is derived, as electrical energy, to the outside.

The above description can meet an ideal fuel cell operation, however, in actual fuel cells, in relation to the fuel cell operation various phenomena or problems can be seen such as lowering of the fuel cell efficiency and material deterioration of the components. As one of these problems, the problem can be highlighted which lies in gas permeability of the ion exchange membranes as proton conductor. Ideally, it is desired that the proton conductor allows only protons to permeate but inhibits fully hydrogen gas as fuel gas and oxygen gas as oxidizing agent to permeate. However, significant amounts of gas permeation are found in the ion exchange membranes which are in current use.

With gas permeation, the gases are mixed to reduce or drop cell voltage. Further, the reaction of the permeated gases buns the ion exchange membrane to form holes therein undesirably. In the worst case, the fuel cell may become inoperable or may be brought into malfunction.

Regarding the gas permeation, two types can be found, one is that the hydrogen permeates the membrane to reach the cathode side; the other is that the oxygen permeates the membrane to reach to the anode side.

Japanese Patent Laid-open Publication Hei.6(1994AD)-103992 discloses a polymer solid electrolyte type fuel cell whose objects are to make it possible to prevent a cell voltage decrease due to a gas permeating through an ion exchange membrane and to make it possible to employ an inexpensive hydrocarbon-based ion exchange membrane as an ion change membrane. For accomplishing the objects, in the polymer solid electrolyte type fuel cell, a catalyst layer is formed in an ion exchange membrane so as to be electrically isolated from both anode and cathode electrodes.

The fuel cell disclosed in the above-mentioned Japanese Publication teaches that hydrogen permeating through an anode toward the counter electrode side and oxygen permeating through a cathode are consumed by mutually reacting in a catalyst layer placed perpendicular to the permeation direction of a gas in an ion exchange membrane to form water, and thereby, permeation of a gas decreases to suppress decrease in cell voltage.

The catalyst layer placed in an ion exchange membrane is the to have an effect of converting a radial generated mainly by a cathode reaction into an inactive substance to protect an ion exchange membrane, and have an effect of enabling application of a hydrocarbon-based ion exchange membrane generally believed to be weak against radicals.

However, in this method, only when the stoichiometrical ratio of hydrogen permeating through an anode as a fuel electrode to oxygen permeating through a cathode as an oxidizer electrode is 2:1, both gases are completely consumed in a catalyst layer in an ion exchange membrane, however, in the case of gas permeation at stoichiometrical ratio other than this, it is apparent that there is a problem that a gas of larger permeation amount is not completely consumed and reaches as it is the counter electrode side. Further, according to out study, it is apparent that, even in the case of reaction of hydrogen and oxygen on a platinum catalyst, when the potential of a platinum catalyst is lower than certain level, a radical is generated, and even if a platinum catalyst layer is placed in an ion exchange membrane, a radical is generated to deteriorate a membrane depending on the potential of the above-mentioned platinum catalyst layer, in addition to reaction of hydrogen and oxygen to produce water.

SUMMARY OF THE INVENTION

The present invention has been made in view of the above-mentioned problems and a first aspect of the present invention is to provide a fuel cell which comprises; an electrolyte made of a proton conductor, a fuel electrode provided on one side of the electrolyte, an oxidizer electrode provided on another side of the electrolyte, at least one internal electrode provided in the electrolyte, and voltage application means for applying voltage to the at least internal electrode.

A second aspect of the present invention is to provide a fuel cell whose gist is to modify the structure of the first aspect, wherein the voltage application means is a means for connecting a power source between the at least internal electrode and one of the fuel electrode and the oxidizer electrode.

A third aspect of the present invention is to provide a fuel cell whose gist is to modify the structure of the first aspect, wherein the voltage application means is a means for connecting, by way of one of a conductive member and a load, between the at least internal electrode and one of the fuel electrode and the oxidizer electrode.

A fourth aspect of the present invention is to provide a fuel cell whose gist is to modify the structure of the first aspect, wherein the internal electrode is layered structure.

A fifth aspect of the present invention is to provide a fuel cell whose gist is to modify the structure of the first aspect, wherein the electrolyte is an ion exchange membrane.

A sixth aspect of the present invention is to provide a fuel cell whose gist is to modify the structure of the first aspect, wherein hydrogen or methanol is used as a fuel.

A seventh aspect of the present invention is to prove a method of controlling a fuel cell having an electrolyte made of a proton conductor, a fuel electrode provided on one side of the electrolyte, and an oxidizer electrode provided on another side of the electrolyte, the method comprising a step of controlling a movement of a fuel or oxidizer permeated in the electrolyte by providing at least one internal electrode in the electrolyte and applying voltage capable of oxidizing the fuel or reducing the oxidizer on the internal electrode.

An eighth aspect of the present invention is to prove a method of controlling a fuel cell having an electrolyte made of a proton conductor, a fuel electrode provided on one side of the electrolyte, and an oxidizer electrode provided on another side of the electrolyte, the method comprising a step of suppressing a generation of radicals in the fuel cell by providing at least one internal electrode in the electrolyte and applying voltage on the internal electrode. n object thereof is to provide a polymer solid electrolyte type fuel cell enabling the prevention of decrease in output of a fuel cell caused by permeation of hydrogen which is a fuel of a fuel cell and oxygen as an oxidizer and the like through an ion exchange membrane, damage of a cell by combustion and the like, and chemical deterioration of fuel cell constituent materials such as an ion exchange membrane and the like due to generation of radicals.

BRIEF DESCRIPTION OF THE DRAWING FIGURES

DETAILED DESCRIPTION OF THE PREFERRED EMBODIMENTS

Figure 1:
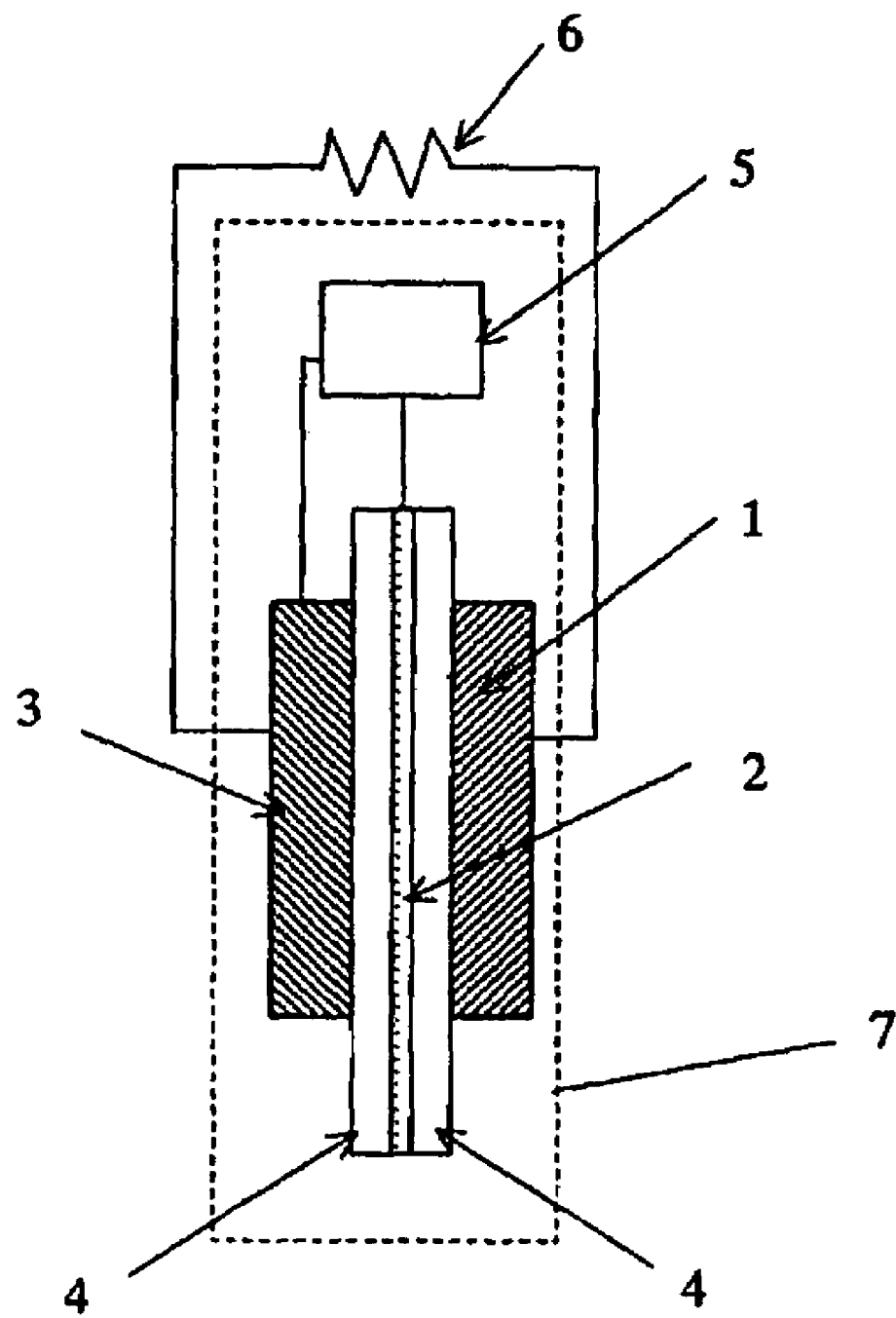
FIG. 1 is a schematic view of a principal portion of a fuel cell of the present invention for illustrating how the fuel cell operates.

Hereinafter, fuel cells embodying the present invention will be described in great detail with reference to the drawings, in which the same reference numerals or codes are used throughout the different drawings to designate the same or similar components.

For describing the principles and concepts of the present invention, a fuel cell 7 is provided or designed which has a structure as shown in FIG. 1, In this fuel cell 7, there is formed a circuit in which a voltage application means 5 is disposed between an internal electrode 2 and a fuel electrode 3 and controlling the electrode potential of the internal electrode 2 causes permeations of fuel and oxidizer into their counter electrodes and radical-producing reaction to restrict. The internal electrode 2 is in the form of any catalyst particles alone or catalyst particles carried on an appropriate carrier member. The internal electrode 2 is in a sandwiched state between a pair of proton conductors 4 and 4. The internal electrode 2 per se should be designed to have proton conductivity so as not to interrupt ion conduction between the proton conductors 4 and 4. h sides thereof is not insulated. For this reason, the internal electrode is required to be constituted by mixing a proton conductive material into the above-mentioned catalyst particles or the like. As the voltage application means 5, say, power source connection, load connection, and short-circuiting are available. Though the following description will be made on an assumption of an open circuit condition wherein the fuel cell 7 is out of connection with an external load 6, the following description can be applied to a closed circuit wherein the fuel cell 7 is in connection with an external load 6 subject to take into consideration of polarizations of the respective fuel electrode 3 and oxidizing electrode 1.

First, a case of no current flowing in the internal electrode 1 is discussed which is established by opening or interrupting the electrical connection between the internal electrode 2 and the fuel electrode 5 with the voltage application means 5 disconnected. In this case, the electrode potential (resting potential) of the internal electrode 2 depends on concentrations of a fuel and an oxidizer which move into the internal electrode 2 after passing or permeating through the proton conductors 4. In a fuel cell using hydrogen and oxide respectively as a fuel and an oxidizer, when permeation of hydrogen is higher than permeation of oxygen, the resting or stationary potential of the internal electrode 2 approaches, from larger side, the electrode potential of a fuel electrode, while when the permeation of oxygen is higher than the permeation of hydrogen, the resting or stationary potential of the internal electrode 2 approaches, from smaller side, the electrode potential of an oxidizer. Whether or not permeation of hydrogen is higher than permeation of oxygen depends on the permeation coefficient of a proton conductor against each of hydrogen and oxygen and gas pressure.

When the stationary potential of the internal electrode 2 is near the electrode potential of the fuel electrode resulting from that the permeation of hydrogen is higher than the permeation of oxygen, the oxygen after permeating through the internal electrode 2 reacts with an excess amount of hydrogen in the internal electrode 2 and is consumed. During this chemical reaction, a radical is formed on the surface of the internal electrode 2 since the electrode potential of the internal electrode 2 is low. The excess amount of hydrogen in the internal electrode 2 permeates toward or moves into the oxidizer electrode 1.

When the stationary potential of the internal electrode 2 is near the electrode potential of the oxidizing electrode resulting from that the permeation of oxygen is higher than the permeation of hydrogen, the hydrogen after permeating through the internal electrode 2 reacts with an excess amount of oxygen in the internal electrode 2 and is consumed. At this stage, the resultant potential restricts a radical formation is restricted. However, the excess amount of hydrogen permeates toward or moves into the fuel cell 3 to reacts with the hydrogen. During this chemical reaction, a radical is formed on the surface of the fuel cell 3 since the electrode potential of the fuel cell 3 is low.

A case will be discussed wherein the voltage application means 5 is connected in the circuit shown in FIG. 1. When the stationary potential of the internal electrode 2 is near the electrode potential of the fuel electrode 3 due to higher permeation of hydrogen than that of oxygen, the voltage application means 5 is used as a power source to apply an electric voltage to the internal electrode 2 which is measured such that the voltage of the fuel electrode 3 is used as a reference voltage and which is higher than the voltage (resting or statistic potential) of the internal electrode 2 relative to the fuel electrode 3. This results in polarization in the internal electrode 2, which causes an oxidizing current to flow therethrough, thereby to shift electrode potential of the internal electrode 2 in positive direction to increase. As a result, production of radicals is restricted or suppressed during a chemical reaction of hydrogen and oxygen in the internal electrode 2. An excessive amount of hydrogen in the internal electrode 2 is brought into oxidization in the internal electrode 2, thereby to suppress or restrict movement of hydrogen to the oxidizing electrode 1. The voltage applied to the internal electrode 2 can be increased to as high as possible so long as no oxidation of water can be found in the internal electrode.

If the stationary potential of the internal electrode 2 is near the electrode potential of the oxidizer electrode 1 due to the fact that the permeation of oxygen is higher than the permeation of hydrogen 1, connecting a load as the voltage application means 5 in the circuit shown in FIG. 1 causes a reducing current to flow through the internal electrode 2 and oxygen present excessively is reduced. Therefore, permeation of the excessive amount of oxygen toward the fuel electrode 3 is made to react with hydrogen to restrict or suppress an occurrence of radical producing reaction. At this stage, the electrode potential of the internal electrode 2 shifts toward in the negative direction to decrease, thereby to decrease the voltage of the internal electrode 2 relative to the voltage of the fuel electrode 3. The load should be adjusted to an extent not to produce a radial due to the fact that too much or excessive decrease of the electrode potential of the internal electrode 2 may promote an occurrence of radicals in the internal electrode 2. Alternatively, it is possible to apply a voltage lower than the stationary potential to the internal electrode 2, which is measured such that the voltage of the fuel electrode 3 is used a reference voltage, when the voltage application means 5 is used as a constant potential apparatus (potentiostat). Further, it may be possible to connect the internal electrode 2 and the fuel electrode 3 in direct mode by using the voltage application means 5 as a short-circuiting device. Due to the fact that such a connection or wiring is equivalent to apply a voltage of substantially zero volts between the internal electrode 2 and the fuel electrode 3, the internal electrode 2 becomes identical substantially with the fuel electrode 3 in electrode potential, which causes a reducing to flown in or pass through the internal electrode 2, thereby reducing the excessively existing oxygen. However, such a wiring or arrangement is improper or not preferable. The reason is that there may be a possibility of a production radical which results from making the internal electrode 2 identical substantially with the fuel electrode 3 in electrode potential.

Figure 2:
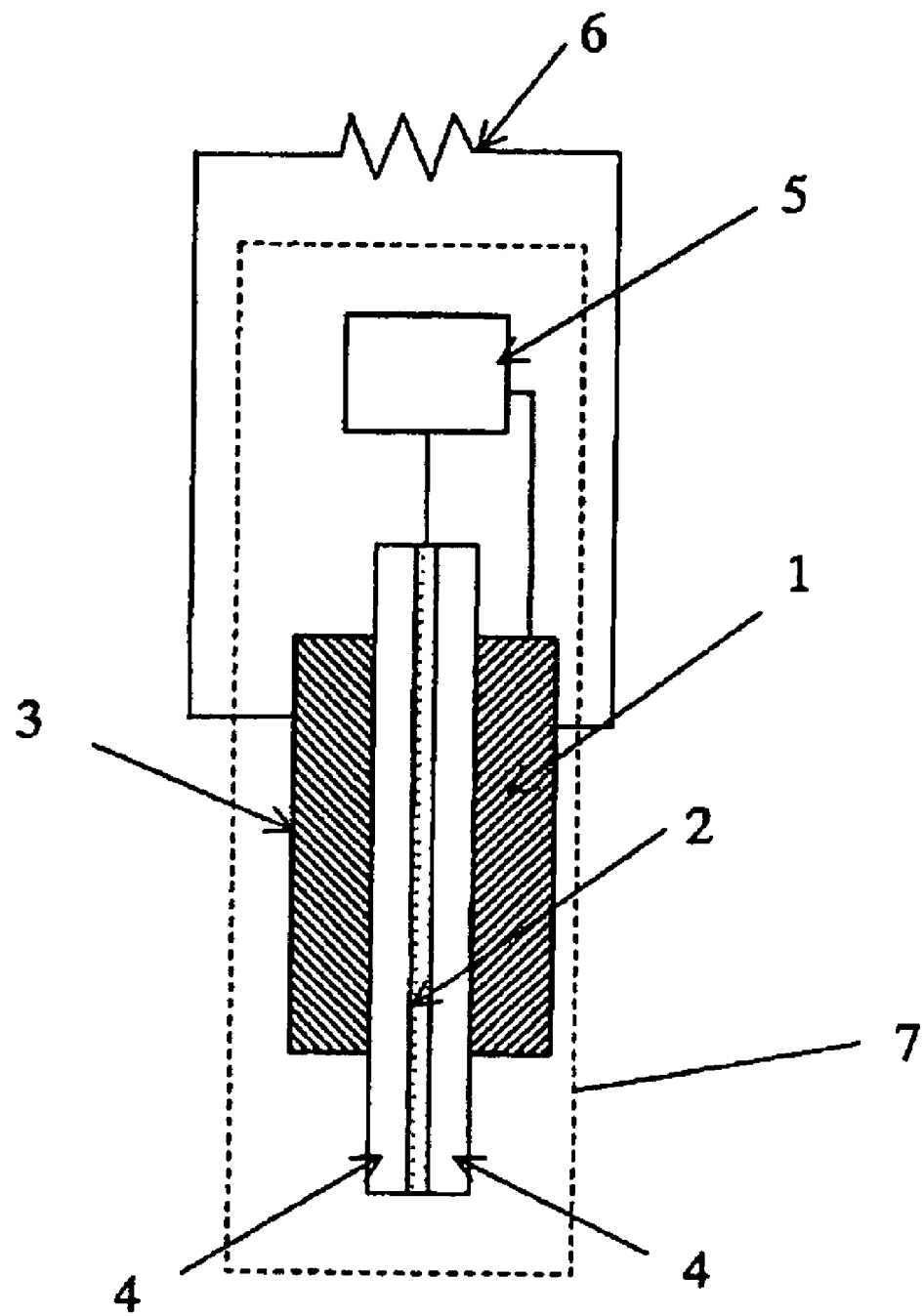
FIG. 2 is a schematic view of a principal portion of a fuel cell of the present invention for illustrating how the fuel cell operates.

Next, an explain is made as to why a control can be achieved, which is similar to the control in the circuit shown in FIG. 1, when a circuit is constituted as shown in FIG. 2 wherein a voltage application means 5 is interposed between an internal electrode 2 and an oxidizer electrode 1 to control or adjust an electrode potential of the internal electrode 2.

When the stationary potential of the internal electrode 2 is near the electrode potential of the fuel electrode 3 due to higher permeation of hydrogen than that of oxygen, the voltage application means 5 is used as a load, which causes an oxidizing current to flow in the internal electrode 2, resulting in oxidization of an excess amount of hydrogen and increasing the electrode potential of the internal electrode 2, thereby restricting a production of radical. Such oxidization restricts hydrogen movement to the oxidizing electrode 1. Instead, the voltage application means 5 is capable of being in the form of a conductive member (short-cutting the circuit). The connection with the conductive member, the electrode potential of the internal electrode becomes higher, which results in restriction of a production of radical. In addition, similar effect can be obtained when the voltage application mean 5 is made to operate as a power source from which a voltage is applied to the internal electrode 2 which is measured such that the voltage of the oxidizing electrode 1 is used a reference voltage and which is higher than a voltage (stationary potential) relative to the oxidizing electrode 1.

When the stationary potential of the internal electrode 2 is near the electrode potential of the oxidizer electrode 1 due to higher permeation of oxygen than permeation of hydrogen, using a power source as the voltage application means 5 makes it possible to apply a voltage to the internal electrode 2 which is lower than the stationary potential and which is measured such that the voltage of the oxidizing electrode 1 is used a reference voltage. Thus, a reducing current flows in the internal electrode 2, resulting in reduction of the excess amount of oxygen, which permeation of the oxygen toward the fuel electrode 3 is restricted. The voltage is adjusted so as not to occurrence of lowering the electrode potential which may follow a production of radical.

Figure 3:
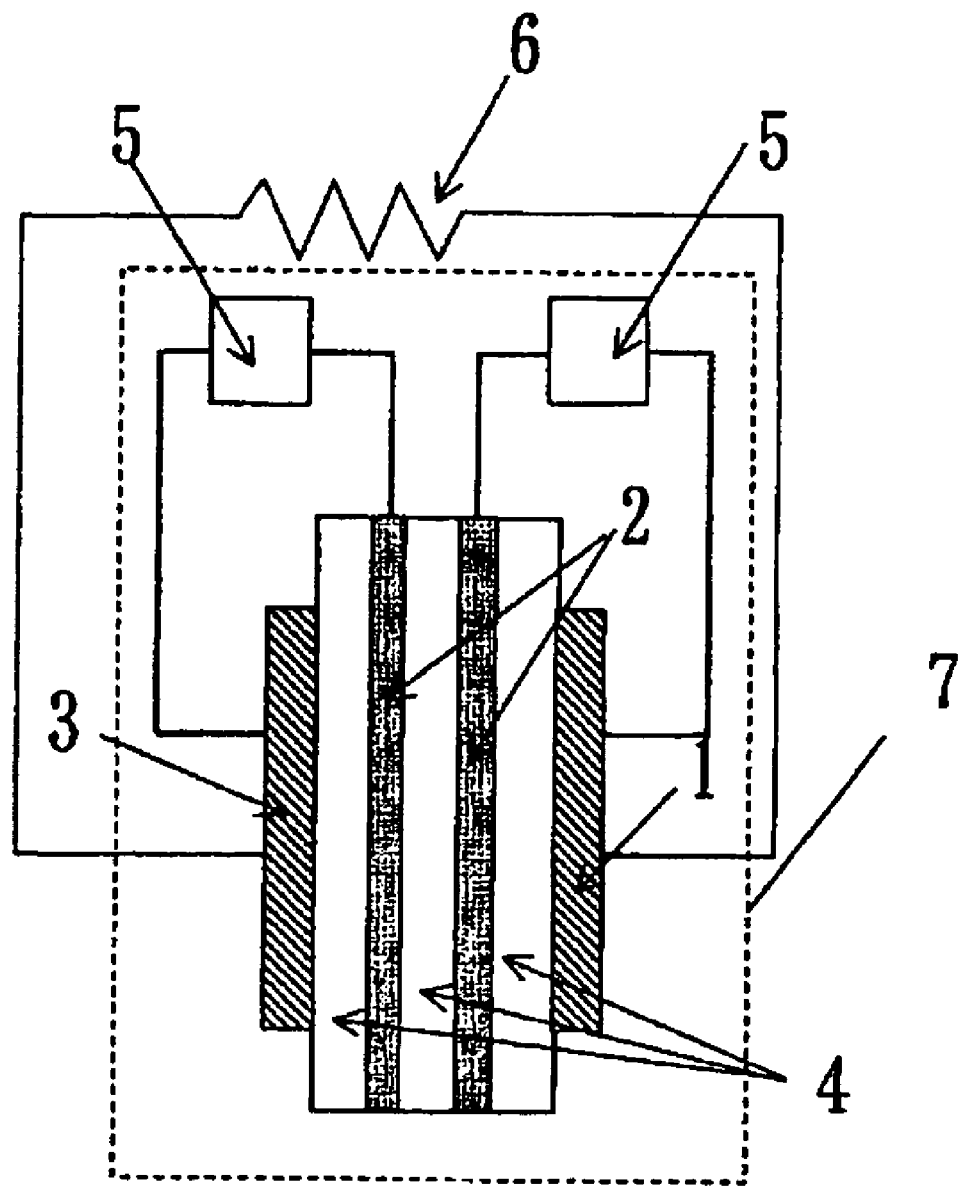
FIG. 3 is a schematic view of a principal portion of a fuel cell of the present invention for illustrating how the fuel cell operates.

Further, a plurality of internal electrodes can be placed in a fuel cell. For example, as shown in FIG. 3, there is illustrated a fuel cell 7 which has three proton conductors 4, two internal electrodes 2 each of which is interposed between two adjacent proton conductors 4, and a pair of voltage application devices 5 and 5 for controlling the electrode potential of internal electrodes 2 and 2, respectively. The design concept is that controlling the electrode potential of each of the internal electrodes 2 makes it possible to flow one of oxidizing current and reducing current therein. In the illustrated state, the internal electrodes 2 are arranged in thickness-direction spaced two layers. One of the voltage application devices 5 and 5 is interposed between the fuel electrodes 3 and one of the internal electrodes 2 for controlling an electrode potential thereof while the other of the voltage application devices 5 and 5 is interposed between the oxidizing electrodes 1 and the other the internal electrodes 2 for controlling an electrode potential thereof.

Namely, the internal electrode 2 near the fuel electrode 3 is controlled to have electrode potential capable of oxidizing a fuel such as hydrogen or the like, while the internal electrode 2 near the oxidizer electrode 1 is controlled to have electrode potential capable of reducing an oxidizer such as oxygen or the like. In brief, in the fuel cell 7 shown in FIG. 3 the electrode potential control made in easy way makes it possible to control the permeations of the respective fuel and oxidizer through each of the proton conductors irrespective of the amounts fuel and oxidizer permeating in the proton conductor 4 and ratio therebetween.

The amounts of a fuel and an oxidizer permeating in the proton conductor and ratio therebetween vary depending on the position in the fuel cell. Namely, sometimes even properly designed or rated electrode potential of the internal electrode may also vary depending on the extending direction of the proton conductor. Therefore, internal electrodes can also be arranged along the direction of scattering of the proton conductor instead of the arrangement of internal electrodes along the thickness direction of the proton conductor 4 in the fuel cell 7 as shown in FIG. 3.

Here, the present invention is not limited to the structures shown in FIGS. 1 to 3 inclusive, and it is apparent from the above-mentioned descriptions that the present invention includes various constitutions other than this having internal electrodes in an electrolyte.

Embodiment 1

Carbon paper having a thickness of 180 μm (diameter: 36.5 mm) was immersed in a 20% PTFE dispersion solution to allow the solution to impregnate, and the paper was dried, then, calcinated at about 400° C. to give water repellency. On one surface of the resultant carbon paper, ethylene-glycol-pasted carbon black was screen printed to form a layer. The resulting member was dried with air and then was dried in vacuum at about 140° C. for 5 hours. Thereafter, the resulting carbon black layer was subjected to water-repellent treatment similar to the above-described water-repellent treatment of the carbon paper.

The resulting carbon paper was applied thereon with a platinum catalyst past, with an applicator (not shown), to form a catalyst layer having a thickness of 300 μm and then is dried in vacuum at 80° C. for 2 hours to produce an electrode with catalyst layer. The platinum catalyst past was prepared such that a platinum-carrying carbon catalyst (platinum carrying amount: 40 wt %), a polymer solid electrolyte membrane solution (Naphyon solution) and a small amount of isopropyl alcohol as a dispersion solvent were mixed to knead.

Styrene was graft-polymerized by radiation into an ETFE base film having a thickness of 25 μm and sulfonated by chlorsulfate to produce a polymer solid electrolyte membrane having a thickness of about 35 μm. Thus produced polymer solid electrolyte membrane was out into two membranes of the same size (about φ60 mm), and the resulting membranes were dried in air. The platinum catalyst paste prepared previously was taken in amount necessary for application of the platinum catalyst and was spray-applied on one surface of one of the membranes. The resulting membrane was dried in air and then were dried in vacuum at 80° C. for 2 hours.

This membrane and the other membrane cut into the same size were immersed into water to give hydrate condition. The resulting membranes are arranged in side-by-side fashion such that the above-mentioned their platinum catalyst paste applied surfaces were opposed to each other. Between these platinum catalyst paste applied surfaces, there is sandwiched a lattice having a lattice spacing of about 6 mm and formed of platinum extremely fine wires (wire diameter: 20 μm). The resulting membranes were provided on their outer sides with the above-mentioned catalyst-layered electrodes and were united or formed into one unit by hot press (160° C., 7.845 MPa (80 kg/cm$^2$)), thereby to produce a membrane (with internal platinum catalyst layer)/electrode connected body (herein after, abbreviated as "MEA containing internal electrode"). In the membrane in this MEA containing internal electrode, the platinum catalyst layer and platinum extreme fine wires placed in the form of lattice correspond to the internal electrode in the present invention. The platinum extreme fine lines constitute a collector performing electrical connection for applying voltage to the internal electrode.

This internal electrode provided MEA was fixedly sandwiched between a pair of small sized portable collectors which are prepared for test evaluation and which have an inner gas flow channel. An experimental circuit as shown in FIG. 1 was constituted in which a potentiostat 5 was connected as a voltage application device between the anode (fuel electrode) 3 and the internal electrode 2. However, in this experiment, the fuel cell was experimented in an open-circuit condition without connecting the outer load 6.

Hydrogen and oxygen were, after being passed through their own gas bubblers (kept at about 30° C.) containing pure water to be humidified, were supplied to the anode 3 and the cathode (oxidizer electrode) 1, respectively, at a rate of 100 mL per minute for a time duration of 20 minutes or more to establish gas replacement in the gas piping arrangement and the fuel cell body. Then, gas valves of inlets and outlets for respective gases in the fuel cell were closed, to seal about 1 liter of each gas (volume including the content volume of the fuel cell and appended gas piping portions and the like) at 2 atm and the cell temperature was kept at 80° C. Further, with the potentiostat 5 the electrode potential of the internal electrode 2 was controlled to +0.8 V which was measured such that the voltage of the anode (fuel electrode) 3 is used as a reference voltage, and the gas sealed (no load) condition was being kept for a time duration of 15 hours. Another experiment using the same rated or specified MEA with internal electrode was conducted which is similar to the above experiment except that the electrode potential of the internal electrode 2 was not controlled. The results were compared with those of the above-mentioned or potential controlled.

When changes in cell voltage in the experiments of gas sealing were compared, cell voltage decreases with time in the case of no potential control of the internal electrode 2 while in the case of potential control, constant voltage which was approximately the same as the initial voltage was maintained until completion of the experiment.

After the experiments, the gas was leaked and MEA was removed out from each experiment cell, and the catalyst layer adhered to the electrode and polymer electrolyte membrane was removed to obtain a membrane single body, and this was immersed into 1 N KOH for deleting the influence of water contained in the membrane and dried, and subjected to infrared spectral analysis. As a result, in the experiment conducting no potential control, there was no change in the height of an infrared absorption peak (wave number: 2980 cm$^{-1}$) regarding C—H elongation vibration of ETFE which was a base film of the membrane, by this, it was judged that the base film had no deterioration, however, there was observed apparent decrease in the heights of a peak (wave number: 2930 cm$^{-1}$) regarding C—H elongation vibration of a benzene ring of styrene (graft chain) and of a peak (wave number: 1410 cm$^{-1}$) regarding C—C elongation vibration of a benzene ring, teaching that the membrane was oxidation-decomposed and that grafted styrene fell. In contrast, in the case of the experiment of potential control, heights of these peaks did not change from those before the experiments, recognizing no membrane deterioration.

These results are explained as described below. An oxygen gas which would shift to the fuel electrode side is consumed by reacting with an excess hydrogen gas at the internal electrode, and reaching of the oxygen gas to the fuel electrode side is suppressed. On the other hand, an excess hydrogen gas not reacted with oxygen is oxidized in the internal electrode, and reaching to the oxidizer electrode side is suppressed. As a result, membrane deterioration and decrease in cell voltage (open-circuit voltage) by mixing of a hydrogen gas and an oxygen gas are suppressed. By controlling the potential of the internal electrode to positive value, generation of radicals at the internal electrode is suppressed, and membrane deterioration is prevented.

Embodiment 2

A goa select membrane (manufactured by Japan Goatez, thickness: 30 µm) was out into same sized membranes (diameter: about 60 mm) and the resulting membranes were dried in air. A predetermined amount of platinum catalyst paste was prepared which had been produced by a method similar to that in the embodiment and was sprayed on one surface of one of the membranes to apply. Hereinafter, the resulting or spray-applied layer is called "internal electrode". This membrane was dried in air and then was vacuum-dried at 80° C. for 2 hours or more. As comparison species, two Goa select membranes having the same specification (thickness: 30 µm) as the above were prepared. A polymer solid electrolyte membrane solution (Naphyon solution) was sprayed one surface of one of the comparison piece membranes to apply such that the amount of the polymer solid electrolyte membrane solution is as same as the amount of the platinum catalyst paste. The resultant comparison piece was, then, dried in brown air and was dried in vacuum at a temperature of 80° C. for a time duration of 2 hours.

The above-mentioned platinum catalyst paste-applied membrane and another membrane on which no material had been applied were immersed into water for being made hydrous, a platinum mesh (thickness: 20 µm) as a collector was sandwiched between the two polymer electrolyte membranes such that the above-mentioned platinum catalyst paste-applied surface faced inside. Further, Electrodes produced in the same manner as in the case of the embodiment 1 were placed on its outer sides (both surfaces), and were integrated by hot press (160° C., 7.845 MPa (80 kg/cm$^2$)) to produce a membrane (with internal electrode)/electrode connecting body (hereinafter, abbreviated as "MEA containing internal electrode").

For comparison, the above-mentioned comparison test membrane on which only the polymer electrolyte membrane solution had been applied and the other comparison test membrane on which no material had been applied were integrated by similar hot press to produce MEA connecting two membranes without providing therebetween an internal electrode. Hereinafter, thus prepared member is referred to simply as "comparative MEA".

The resultant comparative MEA was inserted into the portable fuel cell for evaluation in the same manner as in the embodiment 1, and an experimental circuit as shown in FIG. 1 was constituted in which a potentiostat 5 was connected between the fuel electrode 3 and the internal electrode 2. A nitrogen gas passed through a gas bubbler (kept at 80° C.) containing pure water was flown at a flow rate of 200 mL per minute to the fuel electrode 3 side of the fuel cell using MEA containing an internal electrode for 20 minutes or more, to perform substitution of gasses at the fuel electrode 3 side of the fuel cell and gas piping portions. An electrolytic current of 3 A was passed through a vessel for electrolysis of water to generate a hydrogen gas and an oxygen gas, and both gases were passed through a gas bubbler (kept at 80° C. both at hydrogen side and oxygen side) containing pure water to give moistened gasses which were introduced into a fuel cell kept at 80° C. The electrode potential of the internal electrode 2 was controlled to +0.8 V, with the potentiostat 5, relative to the electrode potential of the fuel electrode 3, and a cycle operation test was conducted including repetition of a load operation (load current density: 0.1 A/cm$^2$) for 1 minute and a non-load operation (open-circuit voltage operation) for 3 minutes. In this case, an oxidizing current of about 2 mA was observed constantly in the internal electrode 2. Separately, a cycle operation test was conducted at the same conditions except that the electrode potential was not controlled for the comparative MEA, and its cell behavior and other behaviors were compared to those of the MEA containing internal electrode.

Figure 4:
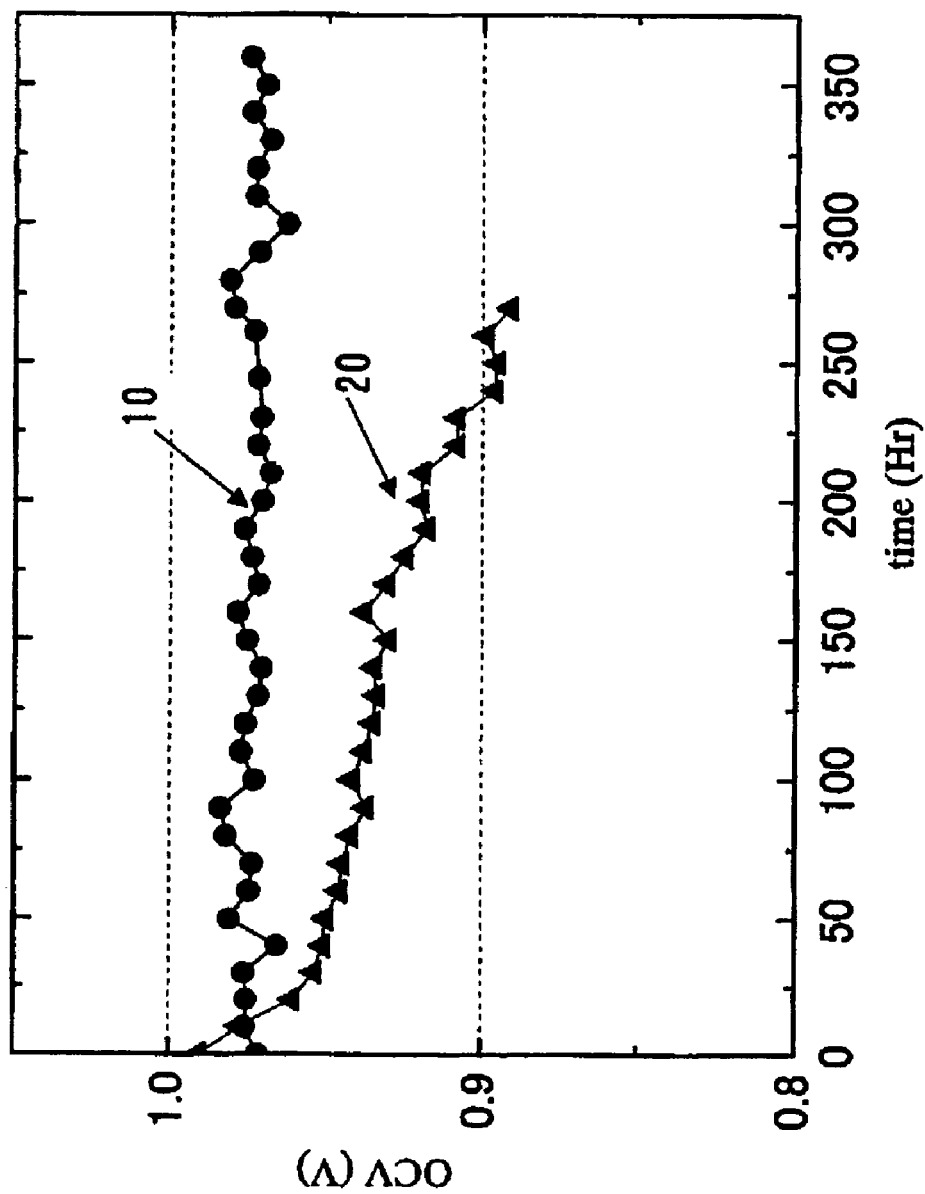
FIG. 4 is a view showing experimental results in Embodiment 2 of the present invention.
Figure 5:
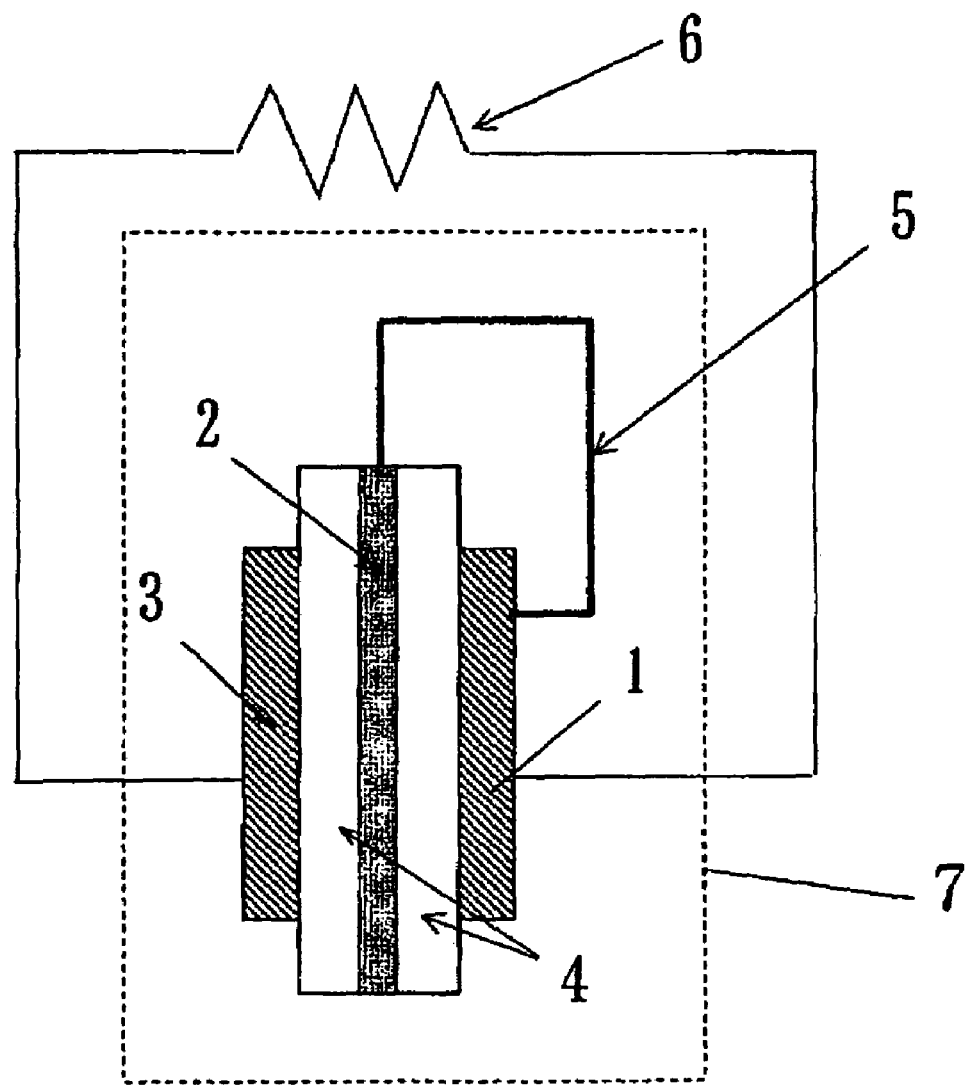
FIG. 5 is a schematic view of a principal portion of a fuel cell of the present invention for illustrating how the fuel cell operates.

The results of the cycle operation test are shown in FIG. 4. When that represented by plot 10 is MEA containing an internal electrode, that represented by plot 20 shows cell voltage (open-circuit voltage) of each cycle of comparative MEA. In case of using the MEA containing internal electrode, a cell voltage (open-circuit voltage) of about 1 V was maintained from initiation of cycle operation to even after 250 hours.

In contrast, in the case of using the comparative MEA, the cell voltage (open-circuit voltage) begun to drop when about 100 hours had passed after initiation of operation, and at a time lapse of 230 hours from the initiation of the operation the drop and fluctuation of the cell voltage (open-circuit voltage) became drastic. Thus, the condition was found not to be allowable to continue the operation, resulting in the operation termination. Thereafter, when the comparative MEA was removed from the fuel cell to examine, it was found that a portion of the membrane had been discolored to white and the white-discolored portion was formed therein a hole. In contrast, the MEA containing internal electrode was found to be free from both discolored portion and hole.

The above-mentioned potential control of the internal electrode (platinum catalyst layer electrode) of the MEA containing internal electrode restricts the hydrogen permeation through the oxidizer electrode (oxygen electrode side), in either of load connected operation mode and open-circuit voltage mode, to, results in the effects in cell voltage (open-circuit voltage) stability and membrane deterioration restriction that are described in the latest paragraph, which makes a remarkable difference in durability between both the MEAs.

Embodiment 3

An internal electrode containing MEA was produced using the same method and the same materials as in the embodiment 1, to constitute a fuel cell. However, in this experiment, the experiment was conducted with an open-circuit without connecting an outer load 6. A nitrogen gas passed through a gas bubbler (kept at 80° C.) containing pure water was flown at a flow rate of 200 mL per minute to the fuel electrode 3 side of the fuel cell for 20 minutes or more, to perform substitution of gasses at the fuel electrode 3 side of the fuel cell and gas piping portions. Then, hydrogen and oxygen passed through a gas bubbler (kept at 30° C.) containing pure water dedicated for each gas to be moistened was flown at a flow rate of 100 mL per minute to and the fuel electrode 3 side the oxidizer electrode 1 side respectively, for 20 minutes or more, to perform substitution of gasses in gas piping and fuel cell body. Then, gas valves of inlets and outlets for respective gases in the fuel cell were closed, to give a condition sealing about 1 liter of each gas (volume including the content volume of the fuel cell and appended gas piping portions and the like) at 2 atm, the fuel cell temperature was kept at 800° C. The electrode potential of the internal electrode against the electrode potential of the fuel electrode 3 was about 0.1 V.

Next, the oxidizer electrode 1 and the internal electrode 2 were connected via a conductive wire (voltage application means 5) which is a conductive means to flow oxidizing current through the internal electrode 2. At this time, the electrode potential of the internal electrode 2 can be regarded as the almost same as the electrode potential of the oxidizer electrode 1. This condition was being left for a time duration of about 16 hours.

Figure 6:
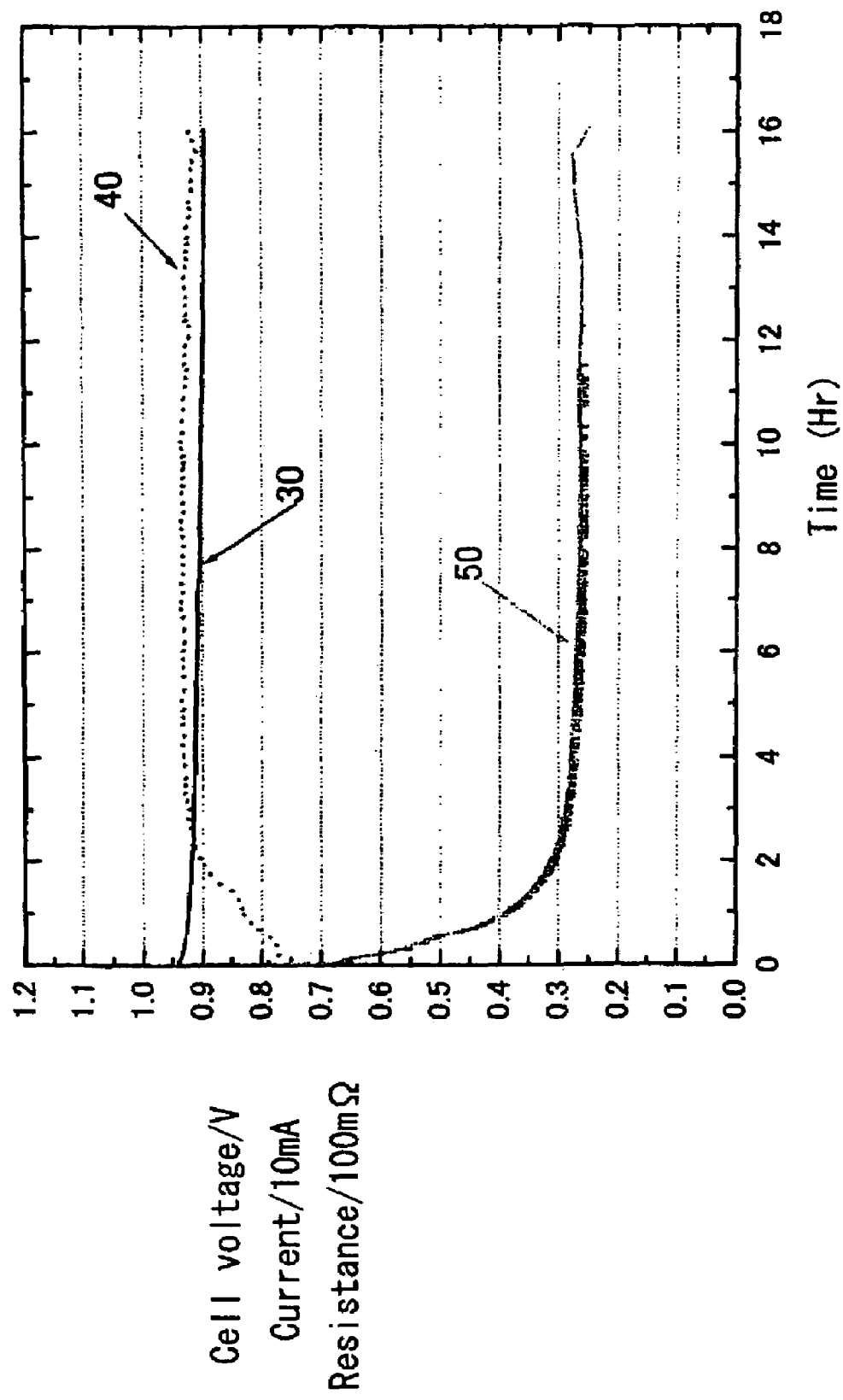
FIG. 6 is a view showing experimental results in Embodiment 3 of the present invention.

The results are shown in FIG. 6. The cell voltage of the fuel cell is represented by plot 30, the oxidizing current of the internal electrode is represented by plot 40, and the cell resistance of the fuel cell is represented by plot 50. Decrease in the cell resistance immediately after initiation of the experiment and increase in the oxidizing current of the internal electrode 2 are believed to be caused by a fact that a proton and oxygen reacted on the internal electrode 2 and the oxidizer electrode 1 to produce water, and by this water, the membrane was moistened and the resistance decreased, and at the same time, the amount of a gas permeating through the membrane increased. Thereafter, the cell voltage of the fuel cell was about 0.9 V and the oxidizing current of the internal electrode 2 showed a constant value of about 9 mA.

After the experiment, the internal electrode containing MEA was removed from the fuel cell, and the catalyst layer adhered to the electrode and polymer electrolyte membrane were removed to make the membrane in a single mode, and the resulting membrane was subjected to infrared spectral analysis. As a result, no membrane deterioration was confirmed.

This shows that results similar to those of Embodiment 1 were obtained resulting from oxidizing current flow through the internal electrode 2 upon connection, by way of conductive means, between the internal electrode 2 and the oxidizer electrode 1. Namely, it was found that the same effect as that of a voltage application means such as a potentiostat and the like is obtained even with a passive means such as a short circuit obtained by connecting the internal electrode 2 to the oxidizer electrode 1 or the fuel electrode 3 via a conductive means.

Embodiment 4

A fuel cell as shown in FIG. 1 was produced using an internal electrode containing MEA produced in the same manner as in the embodiment 2. However, in this experiment, the experiment was conducted with an open-circuit without the outer load 6.

A nitrogen gas, after passing passed through a gas bubbler (kept at 80° C.) containing pure water, was flown at a flow rate of 200 mL per minute to the fuel electrode 3 side of the fuel cell for a time duration of 20 minutes or more, for gas substitution at the fuel electrode 3 side of the fuel cell and its associated gas piping portions. Then, hydrogen and oxygen passed through a gas bubbler (kept at 30° C.) containing pure water dedicated for each gas to be moistened was flown at a flow rate of 100 mL per minute to the fuel electrode 3 side and the oxidizer electrode 1 side for a time duration of 20 minutes or more respectively, for gas substitution of in the fuel cell body and its associated piping structure.

The potentiostat 5 as a voltage application means was used to control the electrode potential of the internal electrode 2 relative to the fuel electrode. The amount of hydrogen permeating to the oxidizer electrode 1 side was measured with gas chromatography while changing the electrode potential of the internal electrode. Current flowing through the internal electrode 2 was measured. Further, the amount of permeating hydrogen and current flowing through the internal electrode were measured in the same manner, also when the gas flown to the oxidizer electrode 1 was changed from pure oxygen to air.

Figure 7:
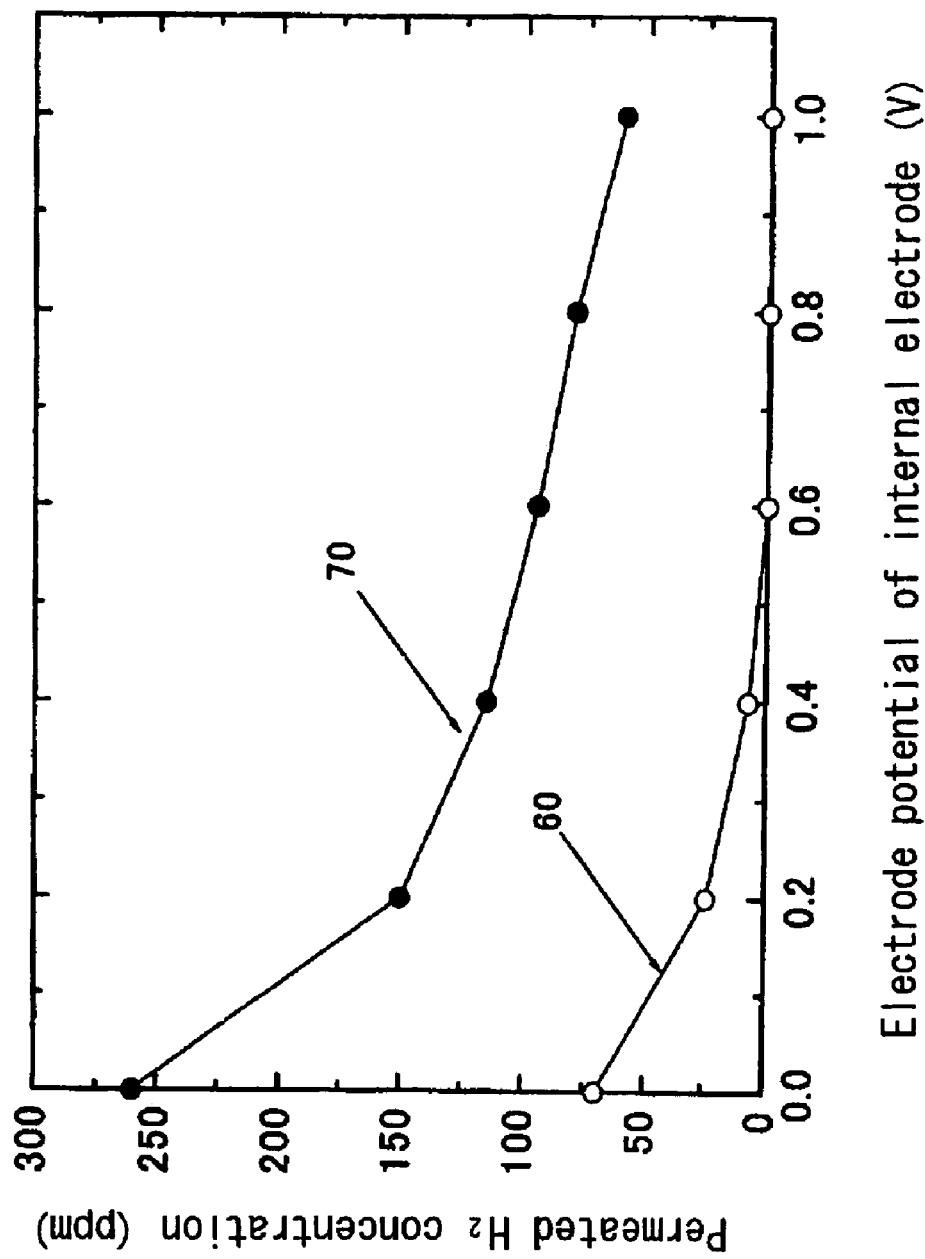
FIG. 7 is a view showing experimental results in Embodiment 4 of the present invention.
Figure 8:
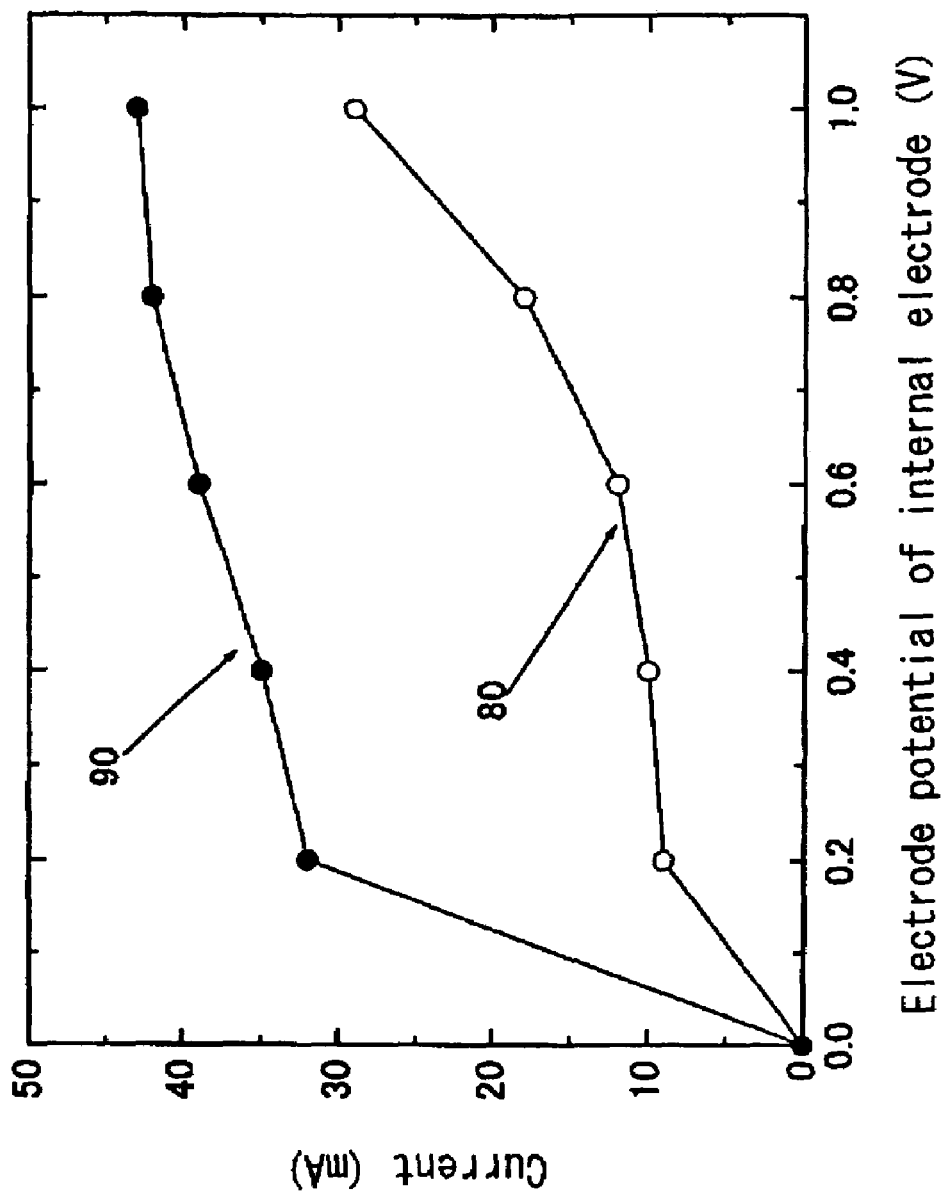
FIG. 8 is a view showing another experimental results in Embodiment 4 of the present invention.

The results are shown in FIG. 7 (correlation of the electrode potential of the internal electrode vs. the fuel electrode and the amount of hydrogen permeating through the proton conductor) and FIG. 8 (correlation of the electrode potential of the internal electrode vs. the fuel electrode and current flowing through the internal electrode). Plots 60 and 80 represent the case using pure oxygen and plots 70 and 90 represent the case using pure air. From FIG. 7, it was clarified that when the electrode potential of the internal electrode 2 is controlled to the same value, the amount of hydrogen permeating to the oxidizer electrode 1 side is smaller in the case of use of pure oxygen than in the case of using air. The reason for this is believed that the oxygen partial pressure is higher in the case of pure oxygen as compared with the case of air, and larger amount of oxygen is consumed by reacting with hydrogen permeating through the proton conductor 4, therefore, the amount of hydrogen permeating to the oxidizer electrode 1 side decreases. From FIG. 8, it was clarified that a larger amount of current flows through the internal electrode in the case of use of air at the oxidizer electrode 1 side. The reason for this may be that the amount of the flowing hydrogen depends on the remaining or unconsumed amount of the hydrogen after the reaction thereof with the permeating oxygen. Namely, when air is used, it is necessary to further increase the electrode potential of the internal electrode 2, for attaining suppression of the amount of permeating hydrogen equivalent to that in the case of pure oxygen.

Namely, the suitable value of the voltage applied to the internal electrode varies with factors: fuel cell operation conditions (kinds of fuel and oxidizer, applied pressure, internal electrode containing MEA structure), and the designed or rated amount of permeating hydrogen. In this embodiment, when pure oxygen is used as an oxidizer, the amount of permeating hydrogen can be made approximately zeros by controlling the electrode potential of the internal electrode 2 to +0.6 V relative the fuel electrode 3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A polymer electrolyte fuel cell comprising;
an ion exchange membrane made of a proton conductor,
a fuel electrode provided on one side of the ion exchange membrane,
an oxidizer electrode provided on the other side of the ion exchange membrane,
at least one internal electrode provided in the ion exchange membrane, and
a voltage application device for applying voltage to the internal electrode in order to control an electrode potential of the internal electrode by connecting a power source between the internal electrode and one of the fuel electrode and the oxidizer electrode.

2. The fuel cell according to claim 1, wherein the voltage application device is a device for connecting, by way of one of a conductive member and a load, between the internal electrode and one of the fuel electrode and the oxidizer electrode.

3. The fuel cell according to claim 1, wherein the internal electrode is layered structure.

4. The fuel cell according to claim 1, wherein hydrogen or methanol is used as a fuel.

5. The fuel cell according to claim 1, wherein both the fuel electrode and the oxidizer electrode are in direct contact with different sides of the ion exchange membrane.

6. A method of controlling a polymer electrolyte fuel cell having an ion exchange membrane made of a proton conductor,
   a fuel electrode provided on one side of the ion exchange membrane,
   and an oxidizer electrode provided on the other side of the ion exchange membrane, the method comprising:
   a step of applying voltage capable of oxidizing the fuel or reducing the oxidizer on an internal electrode provided in the ion exchange membrane in order to control a movement of a fuel or oxidizer permeated in the ion exchange membrane.

7. The method of controlling a fuel cell according to claim 6, wherein the method further comprises:
   a step of suppressing a generation of radicals in the fuel cell by preventing the mixture and reaction of the excess permeated oxidizer to the fuel electrode and the fuel, or by preventing mixture and reaction of the excess permeated fuel to the oxidizer electrode and the oxidizer.

* * * * *